Dec. 2, 1952 — H. B. BINGHAM — 2,619,975
MACHINE FOR WASHING WATCH PARTS
Filed Feb. 10, 1949 — 7 Sheets-Sheet 1

Inventor:
Herbert B. Bingham,
by Chudley Chittick
Attorney

Dec. 2, 1952     H. B. BINGHAM     2,619,975
MACHINE FOR WASHING WATCH PARTS
Filed Feb. 10, 1949     7 Sheets-Sheet 4

Inventor:
Herbert B. Bingham
by Yardley Chittick
Attorney

Dec. 2, 1952  H. B. BINGHAM  2,619,975
MACHINE FOR WASHING WATCH PARTS
Filed Feb. 10, 1949  7 Sheets-Sheet 7
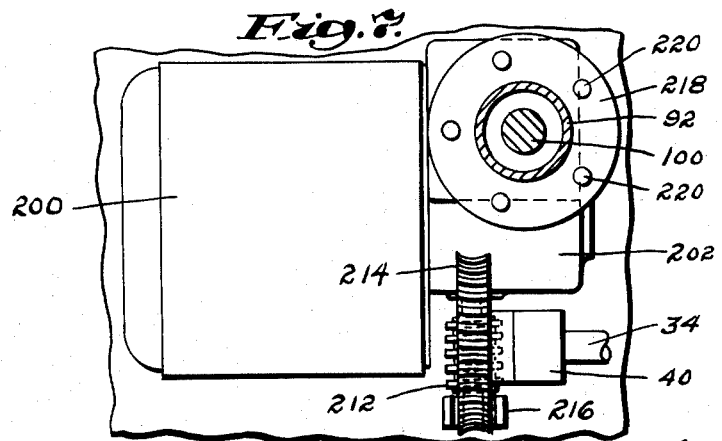
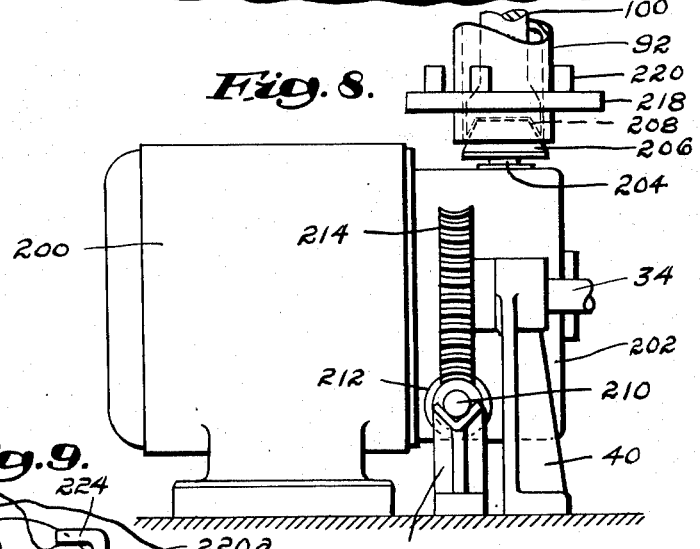
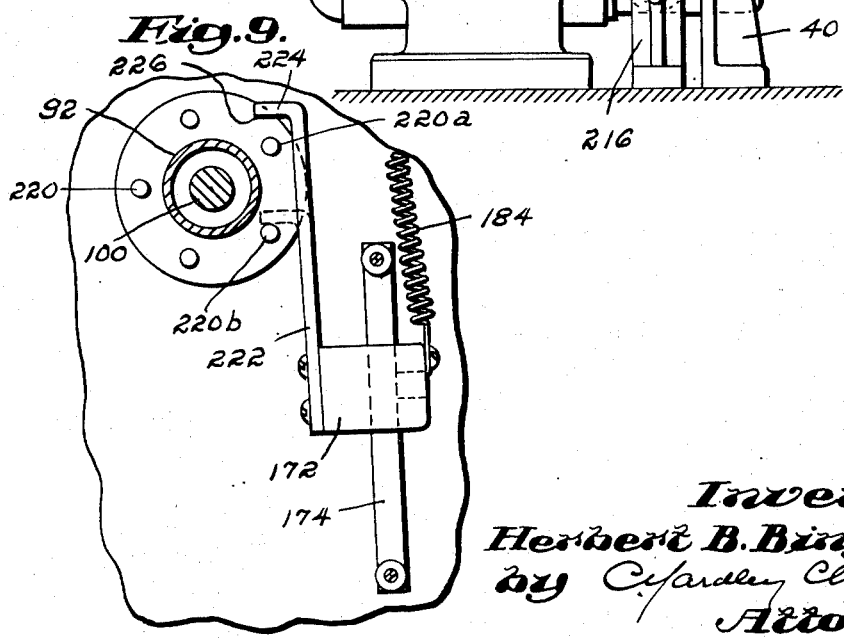
Inventor:
Herbert B. Bingham,
by C. Yardley Chittick
Attorney Patented Dec. 2, 1952

2,619,975

UNITED STATES PATENT OFFICE 2,619,975

MACHINE FOR WASHING WATCH PARTS

Herbert B. Bingham, Waltham, Mass., assignor to
C. Yardley Chittick, Waban, Mass.

Application February 10, 1949, Serial No. 75,654

10 Claims. (Cl. 134—77)

This invention relates to automatic washing and cleaning machines. It is particularly concerned with the provision of a machine having a basket or holder in which objects may be placed and thereafter be put through a series of cleaning, rinsing and drying operations in successive jars or containers at the end of which the machine will come to a halt with the articles cleaned and ready for subsequent use.

While the machine of the present invention has been designed primarily to clean watch parts or other small objects, it will be understood that the dimensions may be increased so that larger elements may be washed and cleaned with equal facility. Thus, it is intended to claim in the present application, machines operating according to the principle of the present invention regardless of physical dimensions. It is also noted that the particular mechanism for causing the basket to vibrate up and down in the cleaning and rinsing solutions and to rotate during the drying operation is the same as or equivalent to that disclosed and claimed in the United States Bingham Patent No. 2,277,508.

While the prior art discloses automatic mechanism for transferring a basket to a succession of jars plus means for varying the time of immersion and with means for stopping the operation at the end of a cycle, and electrical circuit mechanisms whereby the conventional rotating basket may be used with automatic transferring means, the mechanism devised by applicant and disclosed and claimed herein makes it possible to cause all of the operations to take place through the use of a single motor and without the necessity of the inclusion of any electric circuits other than the starting and stopping switch which is turned on manually and turned off at the end of the cycle either manually or automatically in an old and well-known manner.

Therefore, it is an object of the present invention to provide a low-cost automatic washing machine capable of utilizing the invention of the said Bingham Patent No. 2,277,508 and of conducting the washing and drying operations in appropriate successive jar positions.

Another object of the invention is to provide a cleaning unit operating under the influence of mechanical means only thereby achieving maximum economy, simplicity, and durability, whereby the machine may be used commercially day after day without need for constant service.

Another object of the invention is to provide a transfer mechanism which will permit the user to move the basket by hand to any selected jar while the power source is operating, at which position the machine will then carry on the automatic operation.

These and other objects of the inventions will appear more fully as the description proceeds with the aid of the accompanying drawings in which Fig. 1 is a plan view of the machine broken away at several parts to disclose more clearly the construction.

Fig. 7 is a plan view of a construction in which the motor drives the clutch and cam shafts directly.

Fig. 8 is a front elevation of the construction shown in Fig. 7.

Fig. 9 is a plan view of a preferred form of indexing mechanism which permits when desired manual indexing of the basket in either direction.

General scheme of operation

The general scheme of operation is as follows:

A manually operated mercury switch is thrown to "on" position which starts an electric motor. This motor through a suitable gear train causes rotation of a vertical shaft that extends upwardly through the central basket supporting post to drive the basket mechanism. The basket, restrained against rotation, is vibrated vertically while in the first cleaning jar. While vibration continues, cams are slowly rotating and, in due course, one of these cams operates a lever mechanism which raises the central post and basket and disconnects simultaneously a clutch so that the basket vibration ceases prior to the removal of the basket from the first cleaning jar. When the basket has cleared the jar, it is then indexed by operation of a second cam to a position over a second jar. When in the new position, the first cam permits the center post to be lowered so that the basket is placed in the second jar and, on reaching lower-most position, the clutch is re-engaged and vibration of the basket re-commences. This series of operations is repeated to move the basket successively to each jar. Certain of the jars do not contain liquid and in those it may be desired to rotate the basket to throw off surplus liquid remaining from the previous cleaning or rinsing solution. In the empty jars, therefore, no basket restraining means is provided and, hence, in accord with the Bingham principle disclosed in Patent No. 2,277,508, the basket rotates instead of vibrating to dry the contents by centrifugal action. When the basket leaves the last jar and is being indexed to the first jar, a projection on one of the rotating parts engages a member connected with the switch so that the electric circuit to the motor is broken and the machine comes to a halt.

The detailed mechanism that causes the foregoing generally described operation to take place will now be referred to in detail.

Figure 2:
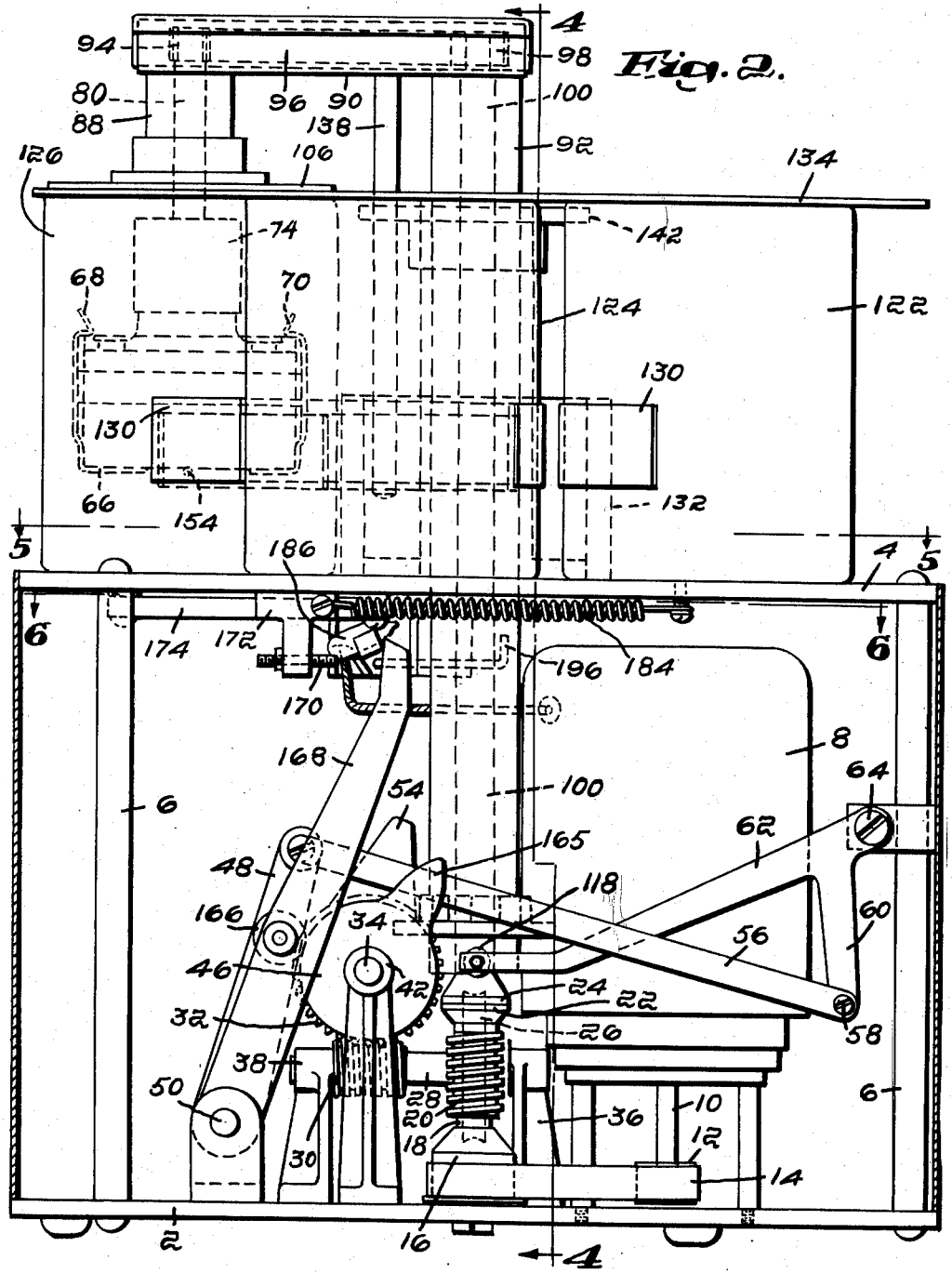
Fig. 2 is a front elevation of Fig. 1 with the housing about the lower portion of the machine removed.

Referring to Fig. 2, there is a supporting framework consisting of a base plate 2, an upper plate 4 and a plurality of supporting and spacing posts 6.

A motor 8 is suitably mounted on base plate 2 having its shaft 10 extending downwardly with a pulley 12 thereon. This pulley drives belt 14 which in turn drives the centrally located vertical pulley 16. A shaft 18 extends upward from pulley 16 and carries a worm 20. The upper end of shaft 18 terminates in a clutch plate 22 which is adapted to engage a corresponding clutch plate 24. The description of the operation of the clutch will follow in due course.

Figure 6:
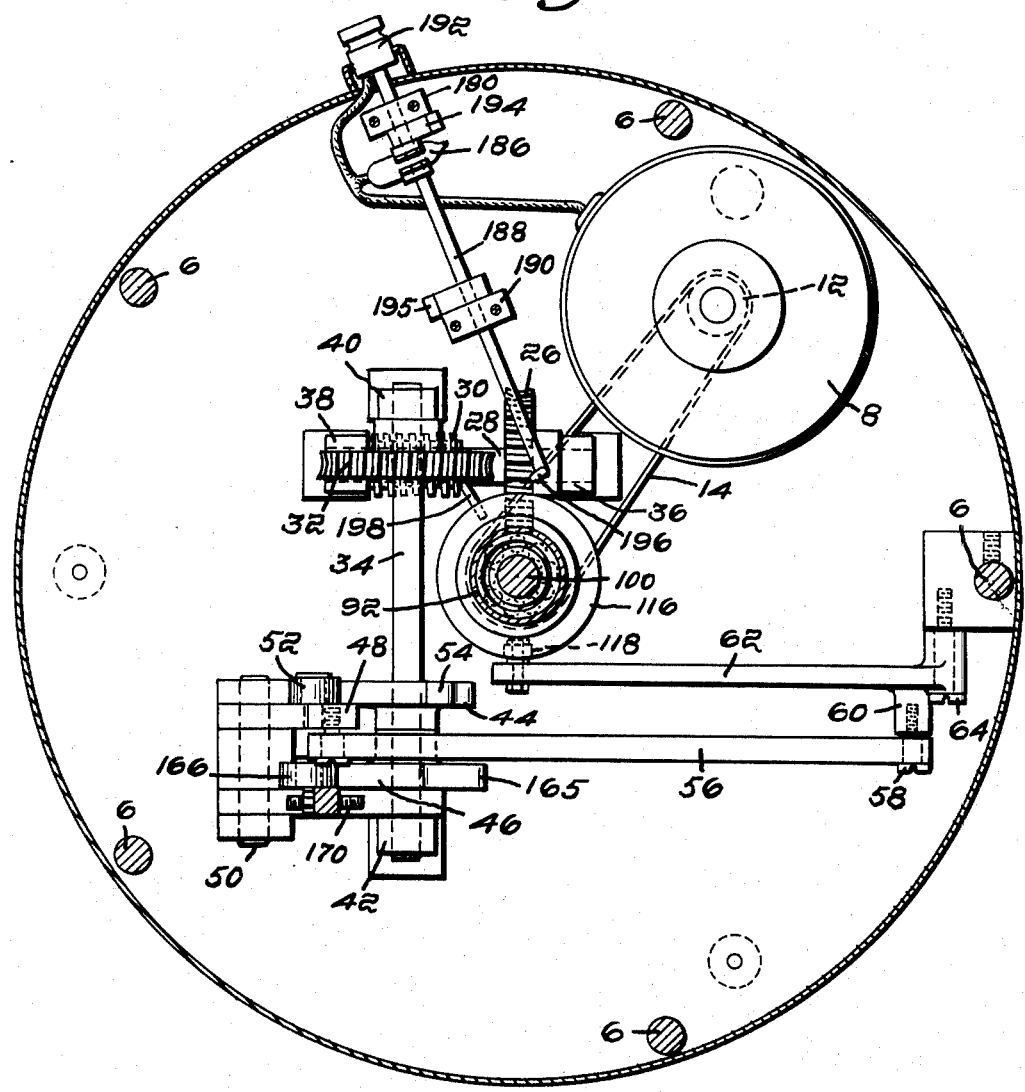
Fig. 6 is a sectional plan view on the line 6—6 of Fig. 2.

Worm 20 drives gear 26 (see Figs. 4 and 6) fixed to shaft 28. On the other end of shaft 28 is secured a second worm 30. This worm, in turn, drives gear 32 which is secured to shaft 34. Shaft 28 is mounted on appropriate bearings 36 and 38 while shaft 34 is carried by appropriate bearings 40 and 42.

Fixed on shaft 34 are two cams 44 and 46. Cam 44 actuates the basket raising and lowering mechanism while cam 46 actuates the indexing mechanism.

Referring first to the parts actuated by cam 44, it will be seen (see Figs. 2 and 3) that there is a lever 48 pivoted on shaft 50 and having affixed intermediate its ends a roller 52 adapted to be engaged by extension 54 of cam 44 as the latter rotates with shaft 34. Shaft 34, of course, is rotating relatively slowly by virtue of the worms and gears previously described. However, when the extended portion 54 of cam 44 engages roller 52, the lever 48 will be swung from the position shown in Fig. 2 to the position shown in Fig. 3. This, in turn, will cause the lever mechanism consisting of connecting rod 56 pivoted at 58 to arm 60 and lifting lever 62, pivoted at 64, to move from the positions shown in Fig. 2 to the positions shown in Fig. 3. This lever movement under the influence of cam 44 provides the means for raising the basket from down position within a jar to up position above the jar at which time indexing can occur.

The basket supporting mechanism

The basket which holds the objects to be cleaned is indicated at 66. By means of spring clips indicated at 68 and 70 in Figs. 1, 2 and 3, the basket 66 may be separated from its supporting rim 72. Rim 72, in turn, hangs from a strong collar 74 having thereon an upper cam surface 76 which is in engagement with a lower cam surface 78. This latter surface being the upper face of a short sleeve is attached to shaft 80 by pin 82. When shaft 80 is rotated and basket 66 is restrained from rotation, vertical oscillation will be imparted to the basket. This portion of the invention is disclosed and claimed in the Bingham Patent No. 2,277,508. Shaft 80 is held in position and supported for rotation by bearings 84 and 86 carried by a short tube 88. This tube depends from a suitable crossbar 90 carried by a tubular support or center post 92. The upper end of the shaft 80 carries a pulley 94 over which passes a belt 96 driven by a pulley 98 mounted on the upper end of shaft 100. Shaft 100 is supported for rotation by bearings 102 and 104 carried by the tubular support or center post 92.

A light weight circular cover 106 is secured to tube 88 effectively closing the jar opening when the basket has been lowered therein.

Vertical sliding support for tubular member 92 is provided by the surrounding closely fitted bearing sleeve 108 which is rigidly mounted on upper plate 4 by the flange 110. The bottom end of tube 92 extends downward through a center hole in plate 4 and has pinned thereto a short sleeve 112 suitably notched as at 114 (see Fig. 5) to co-operate with the indexing mechanism. Below sleeve 112 is a circular plate 116 wide enough to be at all times in engagement with a roller 118 mounted on the end of lever arm 62. It will be apparent that as lever 62 moves from its down position shown in Fig. 2 to its maximum position shown in Fig. 3, roller 118 will travel through an arc, the center of which is pivot 64. However, the lateral extent of this arc will not be beyond the confines of plate 116.

Figure 3:
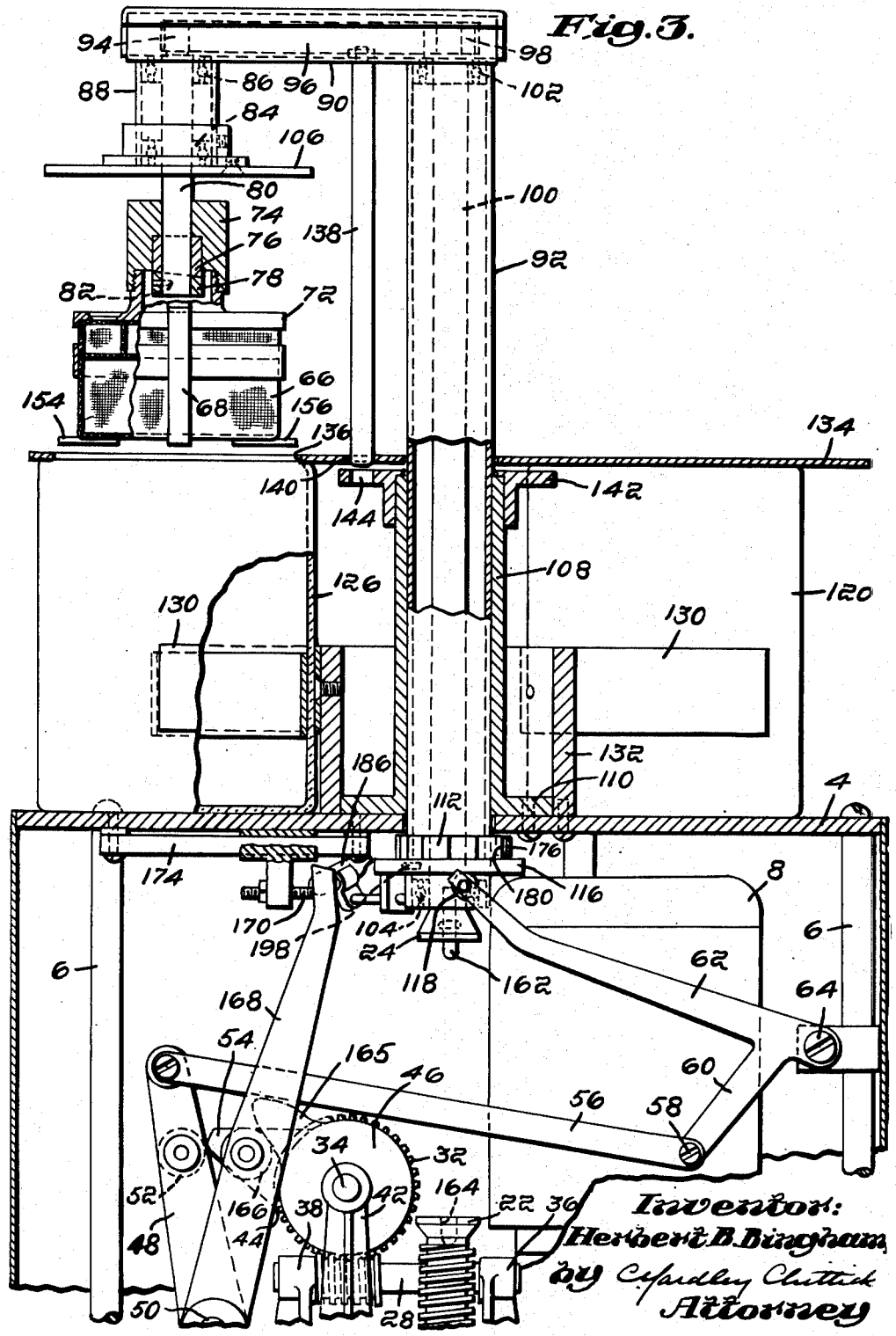
Fig. 3 is a view generally similar to Fig. 2 showing the position of the parts when the basket has been raised above the jars.
Figure 4:
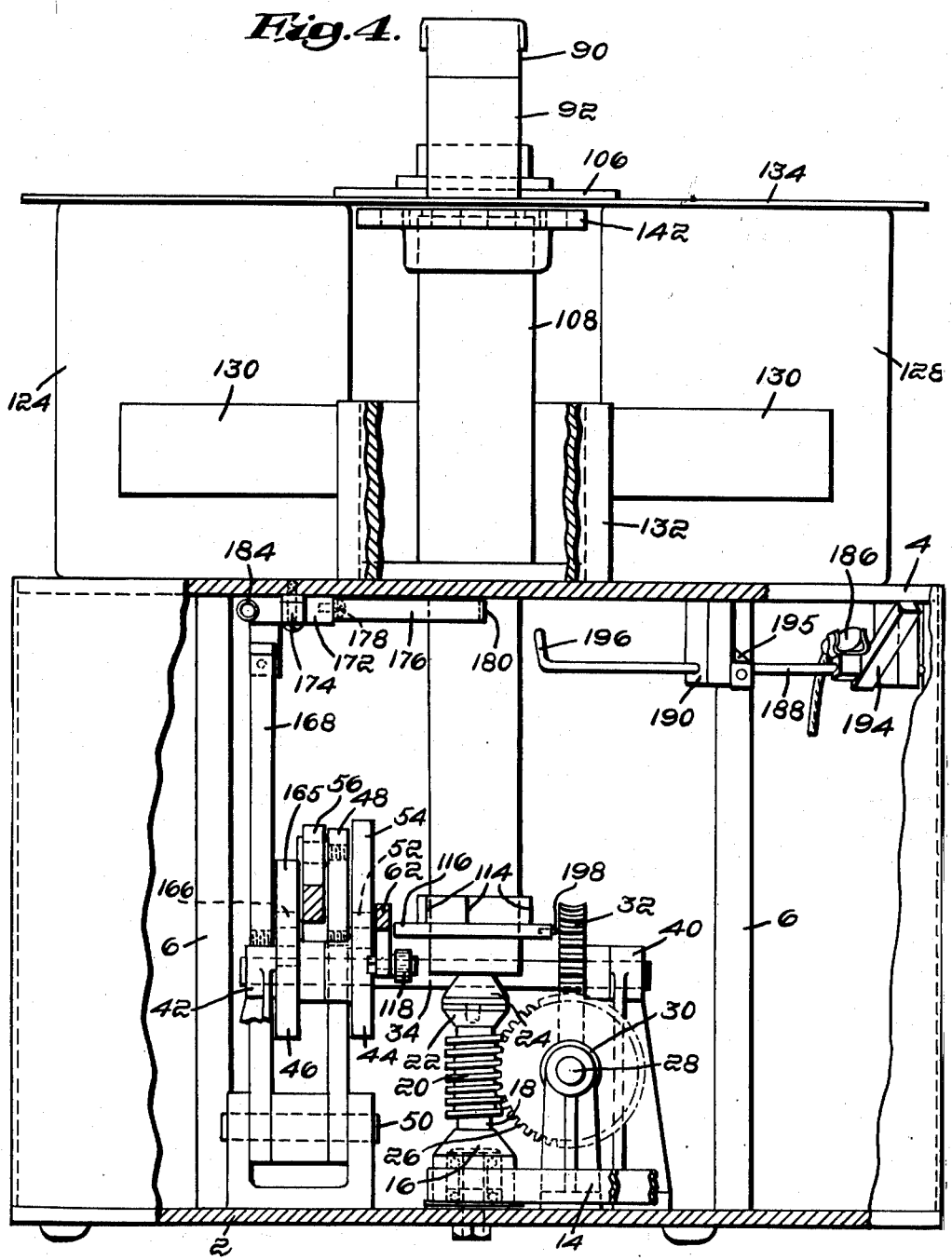
Fig. 4 is a vertical section on the line 4—4 of Fig. 1 showing a substantial portion of the operating mechanism at right angles to the views of Figs. 2 and 3.

From the foregoing description, it can be seen that as cam 44 actuates lever 48, the tubular support 92 will be raised from its down position shown in Figs. 2 and 4 to the maximum raised position shown in Fig. 3. This movement is sufficient to raise the basket from operating position within a container to a position above the container as shown in Fig. 3 where it may be indexed to the next container.

Container supporting structure

Figure 1:
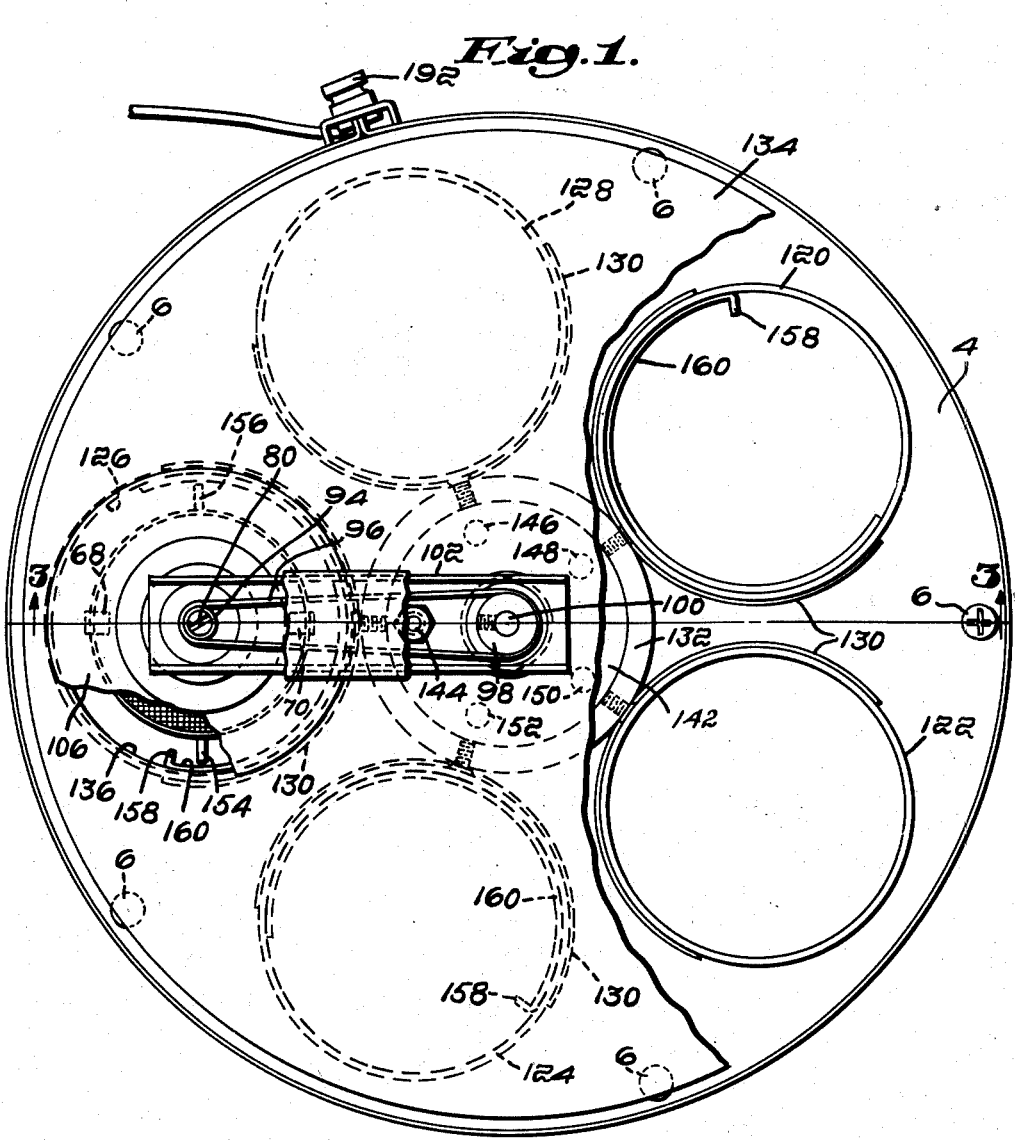

While the number of containers into which the basket is successively positioned may be varied according to trade requirements, the number shown in the present instance, is 5. The jars are indicated in Fig. 1 at 120, 122, 124, 126 and 128. Each jar rests on the base plate 4 and is held firmly in position by an individual spring clip 130. Each clip is secured to a tubular supporting member 132 which, in turn, is rigidly mounted on base plate 4. Resting on the tops of the jars is a circular cover plate 134 which has a single circular opening therethrough indicated at 136 in Figs. 1 and 3. This opening is directly below the basket and will always remain in this relative position for as the basket is indexed from jar to jar the cover 134 is correspondingly rotated by means of the indexing rod 138 which is in engagement at 140 with cover 134 (see Fig. 3) at the time indexing occurs.

In order that the basket may be lowered accurately into each jar, a circular plate 142 is mounted on the upper end of bearing 108. This plate has 5 holes therethrough indicated at 144, 146, 148, 150 and 152 (see Figs. 1 and 3). Thus, unless the basket is aligned with a jar opening, guide rod 138 will not be in alignment with the appropriate hole in plate 142 and post 92 and the basket cannot be lowered. If the alignment, however, is correct, rod 138 will move down through the appropriate hole in plate 142 as arm 62 swings downward and the basket will be positioned properly in the jar.

In the operation of the mechanism disclosed in Bingham Patent No. 2,277,508, it is necessary that the basket be restrained against rotation when vertical vibration is desired. This is accomplished by the provision of a pair of horizontally extending fingers 154 and 156 located on the bottom of the basket. When the basket is in position within a jar in which vibration is to occur, one of these fingers will come into engagement with an inwardly-turned lip 158 on the end of a curved strip of spring material 160 that is in tight frictional engagement with the interior of the jar. Whenever it is desired that the basket rotate in a particular jar, the spring member 160 with its lip 158 is omitted from such jar. Thus, there being nothing to restrain rotation of the basket the basket promptly commences to spin in the manner disclosed in the Bingham patent. The end to end dimension of the fingers 154 and 156 is sufficiently less than the diameter of the jar opening so that there is no interference during raising and lowering of the basket.

Operation of clutch

The vertical vibration of the basket or the rotation of the basket is to occur only when the basket is in its proper position in a jar. Since vibration or spinning can occur only when shaft 100 is rotating, it is believed apparent that such action will not be initiated until the upper clutch member 24 comes into engagement with the continuously rotating lower clutch member 22. Thus, in the position shown in Fig. 2, power is being transmitted from clutch 22 to clutch 24, shafts 100 and 80 are rotating and operation of the basket is proceeding. As soon as clutch 24 has been raised from engagement with clutch 22 by commencement of movement of arm 62, rotation of shaft 100 will cease and vibration or rotation of the basket, dependent on the particular jar the basket is in, will likewise cease. Thus, it will be seen that application of operating power to the basket through the clutch can occur only when the basket is in proper position in a jar.

In order that the two clutch faces may be sure of axial alignment when in engagement, a short centering shaft 162 depends from clutch 24 to enter a deeper corresponding opening 164 in clutch 22.

Indexing mechanism

After the basket has been raised above the jar by upward movement of lever 62, it must be indexed to the next jar. This is accomplished by the following mechanism: cam 46 is set on shaft 34 so that the cam extension 165 engages with a roller 166 mounted on lever 168 just after lever 62 has reached its maximum upward position and the bottom of basket 66 is above the jar top. Cam 46 causes lever 168 to swing to the left from the position shown in Fig. 3. The upper end of lever 168 engages an adjustable stop 170 which is carried by a slide 172 traveling on a shaft 174.

Figure 5:
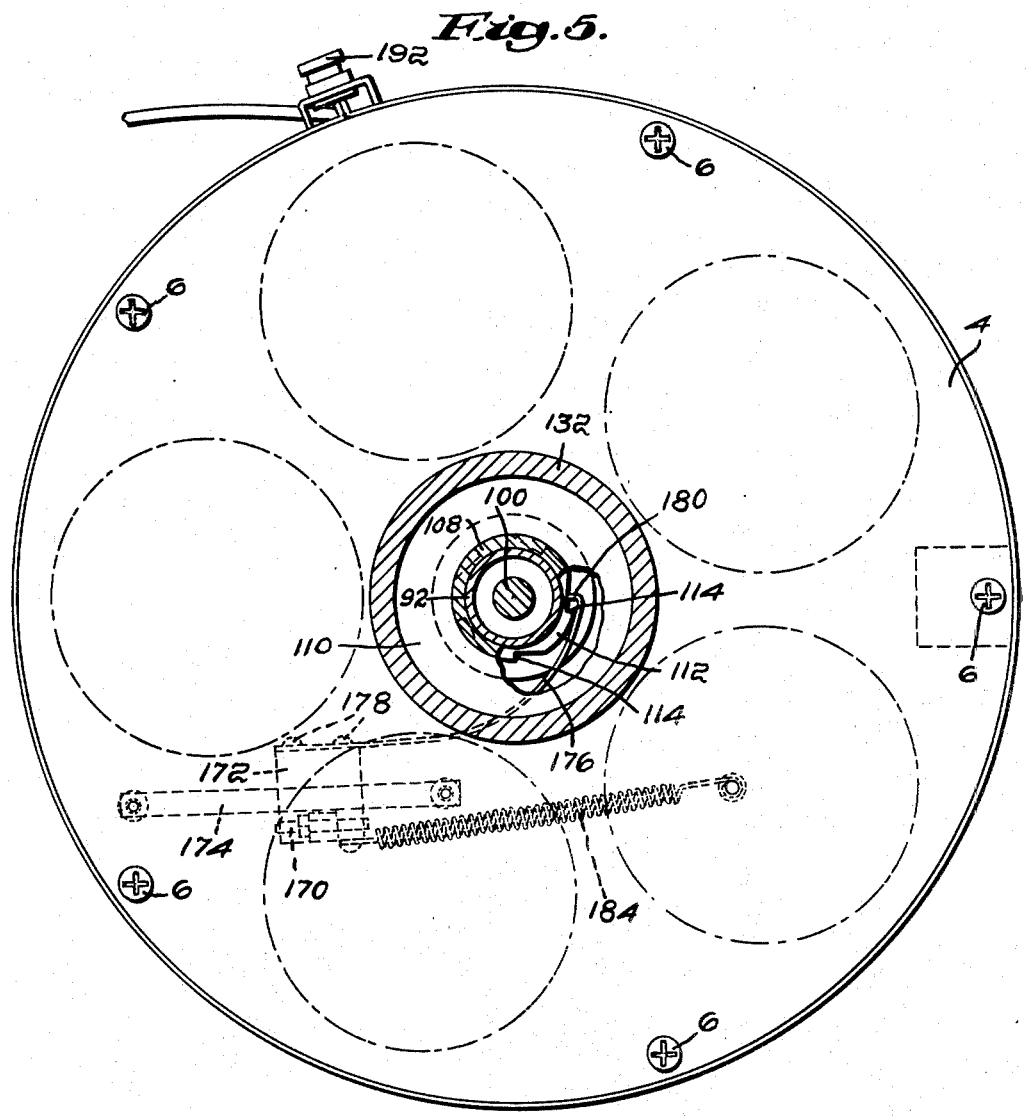
Fig. 5 is a sectional plan view on the line 5—5 of Fig. 2 broken away in part to show more detail of the indexing mechanism.

As can be seen in Fig. 5, one side of slide 172 has affixed thereto a curved spring 176 secured by screws 178. The outer end of spring 176 is turned inwardly as at 180 to form a hook adapted to engage with the notches 114 on the indexing sleeve 112. Thus, as slide 172 moves to the left along shaft 174 under the influence of lever 168, hook 180 will catch on the appropriate notch 114 to swing tube 92 and basket 66 one-fifth of a turn clockwise, at which point guide rod 138 will be located above the next guide hole 146 (see Fig. 1).

At this point, cam 44 will pass the raised dwell position so that lever 62 commences its descent, guide rod 138 descends into the next guide hole 146 to align basket 66 accurately with the jar over which it is then positioned. The notched indexing plate 112 moves downwardly causing notch 114 to free itself from hook 180. Thereafter, with plate 112 out of the way, extension 165 of cam 46 passes roller 166 so that lever 168, slide 172 and hook 180 are returned to the positions shown in Fig. 5 by means of tension spring 184. At this position hook 180 is ready to receive the next notch 114 as indexing plate 112 is raised to the position shown in Fig. 3 on the next cycle.

The limit of rotation of indexing plate 112 may be accurately controlled through the use of the adjacent mechanism 170. This makes it possible to insure that the guide rod 138 will be in such relation to the next guide hole that the lower tapered end of the guide rod when lowered will enter the hole and immediately bring the basket to exact position with respect to the jar.

Thus, so long as motor 8 remains in operation, the basket 66 will be successively lowered into and raised from each of the jars. In order that the machine may be stopped after the complete cycle of operations has been performed, any conventional means may be used to throw off the switch.

Switch mechanism

A switch mechanism that has been found convenient comprises a conventional mercury switch 186 affixed to a shaft 188 rotatably mounted on bearings 190. The outer end of shaft 188 has a finger grip 192 thereon so that the shaft may be rotated to the right until stop 194 comes into engagement with the underside of upper plate 4 or to the left until stop 195 engages the underside of plate 4. When turned to the right, switch 186 will be closed and the machine will be in operation. When turned to the left, the switch will be open and the motor off. The inner end of shaft 188 has an upturned finger 196 which is adapted to be engaged by a pin 198 (see Figs. 3 and 6) that extends horizontally from disc 116. This pin, of course, will only be at a level to engage finger 196 when plate 116 has been raised to the position shown in Fig. 3. Pin 198 is so located angularly with respect to the last jar into which the basket is positioned that it will swing against finger 196 after commencing to index from the last jar to the first jar and before lever 62 has started its downward movement. Thus, when finger 196 is tilted by passing engagement with pin 198 to cause shaft 188 to rotate counter-clockwise, as viewed from the finger grip end, the mercury switch 186 will be opened to stop the motor with the basket in position above and between the last and first jars. In this position, the basket may be unclipped from rim 72 so that the clean parts may be removed from the basket and a new load of dirty parts inserted for the next cleaning cycle.

In the construction heretofore described, the mechanism has been driven by a belt from the motor. This may be simplified by the use of direct drive as shown in Figs. 7 and 8, thereby eliminating a number of parts but in no way affecting the principle of operation.

In Fig. 7 the motor 200 has a gear box 202 extending from one end thereof. Through suitable gearing in the gear box, the motor drives the vertical clutch shaft 204 at the desired speed. Mounted on the upper end of shaft 204 is the lower clutch member 206 which may be of any suitable style. In the form shown it is in the shape of a truncated cone. Clutch member 206 is adapted to engage with a corresponding upper clutch member 208 in the same manner as clutch member 22 and engages clutch member 24. Clutch member 208 is secured to the lower end of shaft 100.

Also extending from gear box 202 is a horizontal shaft 210 geared to the motor shaft to run at substantially the same speed as shaft 20 of the construction previously described. Shaft 210 carries a worm 212 which drives gear 214 mounted on shaft 34, also heretofore referred to. The outer end of shaft 210 is supported by bearing 216.

Thus there have been disclosed alternative means for driving shafts 100 and 34, with the same operative result in each case.

Figs. 7, 8, and 9 also disclose a modified form of indexing mechanism. In place of plate 116 which carries the notched sleeve 112, has been substituted plate 218 having a plurality of equally spaced upwardly extending pins 220. Plate 218 is rigidly connected to center post 92 so that indexing of the plate will cause indexing of the basket in the manner heretofore described.

In place of curved spring 176 with its hook 180 has been substituted a straight rod 222 having its end 224 turned at right angles to provide a pin engaging hook. Bar 222 is connected to slide 172 which is operated by lever 168 in the manner heretofore described.

It will be noted that the inside corner 226 of hook 224 when in retracted position as shown in Fig. 9 is outside of the circular path followed by pins 220. However, when slide 172 is moved horizontally along shaft 174 during the indexing operation, hook 224 will engage the pin numbered 220a in Fig. 9 and move it to position 220b. This movement will constitute one fifth of a revolution so that the basket will be properly positioned for descent into the next jar as soon as the indexing has been completed. Center post 92 and all associated parts including plate 218 descend so that bar 222 may then be returned to inoperative position by the return movement of lever 168 without hook 224 coming into engagement with the next pin that, by that time, has assumed position 220a.

While the invention of the herein described machine is well suited to actuate a basket of the said Bingham patented construction, it is to be understood that any conventional type of basket may be used. The invention broadly contemplates the use of any type of basket which may be operatively connected to the basket driving shaft.

The advantage of this indexing construction is this. If the operator at any time should desire to place the basket in another jar without waiting for the automatic indexing operation to occur, he may do this by grasping crossbar 89 and raising the basket from the jar until the lower end of bar 138 has cleared the top surface of plate 142. The basket may then be moved by hand either to the right or left without interference between the pins 220 and hook 224. This manual indexing should not be undertaken while the indexing mechanism is in operation for then the moving hook 224 would interfere with pins 220.

This indexing construction differs from that shown in Fig. 5 in that the latter permits manual indexing in a clockwise direction only, whereas the construction of Fig. 9 permits manual indexing to the right or left. Manual indexing to the left is occasionally desirable if the operator feels that the objects in the basket should remain, for example, in the cleaning solution for a longer period. If this were found necessary, the basket after being indexed from the cleaning solution jar to the first rinse could be raised from first rinse position and returned to the cleaning solution jar immediately for an additional washing treatment without having to wait for the basket to go through a full cycle.

In the light of the foregoing explanation of the construction, it is apparent that the structure could be modified into equivalent forms which would be within the scope of the invention. For example, the shaft 100 and driving belt 96 used to cause rotation of shaft 84 might be replaced by a bevel gear arrangement, or the end of shaft 100 might have a flexible cable connection leading to the end of shaft 84.

Similarly, the particular lever arrangements for raising and lowering the basket and for indexing might be modified without departure from the spirit of the invention.

In the construction shown and heretofore described, the jars are stationary with the basket being indexed progressively from jar to jar. The indexing mechanism has been shown as actuating the basket carrying structure. It will be understood, however, that, when mention is made in the claims of the indexing mechanism operating to position the basket over the next adjacent container, the claims include within their scope, as the equivalent thereof, structure in which the supporting platform carrying the jars is rotated while the basket is merely moved up and down.

What is claimed as new and as applicant's invention is as follows.

I claim:

1. A machine for transferring a basket to a succession of containers, said machine comprising a plurality of containers circularly arranged, a source of rotary power, a first clutch member driven continuously thereby, a second clutch member movable into and out of engagement with said first clutch member, a first rotatable shaft driven by said second clutch member, a second rotatable shaft related to and driven by said first shaft, a basket operatively connected with said second shaft to be actuated by said second shaft when said clutch members are engaged and while said basket is located within one of said containers, said basket being movable into a position where it is in one of the containers or raised thereabove, a first cam driven by said power source, lever mechanism operated by said first cam to raise and lower said first shaft, second shaft and basket, a second cam timed with respect to said first cam and driven by said power source, indexing means operated by said second cam to cause said basket to be positioned over the next adjacent container after said basket has been placed in raised position by operation of said first cam, and means for starting and stopping said source of rotary power.

2. A machine for transferring a basket to a succession of containers, said machine comprising a plurality of containers circularly arranged, a source of rotary power, a first clutch member driven continuously thereby and rotating about a vertical axis, a second clutch member in alignment with said first clutch member and movable into and out of engagement with said first clutch member, a vertical rotatable shaft driven by said second clutch member when in engagement with said first clutch member, a second vertical rotatable shaft spaced laterally from said first shaft, supporting means for said second shaft, means for causing rotation of said second shaft by said first shaft when the latter is in rotation, a basket carried by said second shaft to be actuated by said second shaft when said clutch members are engaged and while said basket is located within one of said containers, said basket being movable into a position where it is in one of the containers or raised thereabove, a first cam driven by said power source, lever mechanism operated by said first cam to raise and lower said shafts and basket, a second cam timed with respect to said first cam, indexing means comprising a reciprocating element movable in accord with the rotation of said second cam to move said basket relative to said containers when said basket is above said containers, and means for starting and stopping said source of rotary power.

3. A washing machine having means for causing vertical oscillation of a basket in a container and for causing cessation of said oscillation as said basket is being raised to a position above said container, said machine comprising a source of rotary power, a clutch operatively connected with said source of rotary power, a vertically movable rotatable drive shaft driven by said clutch, said clutch being in engagement when said shaft is in its lowermost position, a second shaft spaced laterally from said drive shaft and movable vertically along with said drive shaft, means for causing rotation of said second shaft by said drive shaft, a basket supported in relation to said second shaft to be actuated thereby and movable into a position where it is in one of the containers or raised thereabove, cam means interposed between said second shaft and said basket for causing vertical oscillation of said basket when said second shaft is rotated and said basket is restrained against rotation, a container in which said basket is positioned when said drive shaft is in lower-most position and means fixed with respect to said container for preventing rotation of said basket while said clutch is in engagement and said second shaft is rotating whereby vertical oscillation of said basket will continue so long as said clutch remains in engagement.

4. A machine for transferring a basket to a succession of containers and for causing movement of said basket while in operating position in said containers, said machine comprising a plurality of containers circularly arranged, a source of rotary power, a first clutch member operatively connected to said power source to be driven thereby and rotating continuously and having its axis vertical, a second clutch member movable into and out of engagement with the first clutch member and being on the bottom end of a vertically extending shaft, said shaft being in axial alignment with said first clutch member, a support for said shaft, a bearing for said support whereby the said support and shaft may be moved vertically from a bottom position where said clutch members are in engagement to an upper position where said second clutch member is separated from said first clutch member, means for raising and lowering said support, said means comprising a laterally extending plate connected to said support near its lower end, a cam operated by said power source, a lever adapted to be oscillated under the influence of said cam, additional levers connected to said first lever for multiplying the movement of said first lever, the terminal lever in said system having a bearing surface positioned to engage said plate whereby movement of said first lever will cause said terminal lever to raise and then lower said support from clutch engaging position to a maximum separated position and back to clutch engaging position, a basket carried by the said support and movable into a position where it is in one of said containers or raised thereabove, means adapted to be driven by said shaft for causing movement of said basket when said clutch is engaged, and means for indexing said basket laterally to a position over an adjacent container, said indexing means operable only when said basket supporting member is in substantially its maximum raised position.

5. A washing machine comprising a plurality of jars arranged in circular position on a supporting plate, a center post, a bearing support for said post mounted in fixed relation to said plate whereby said post may be moved vertically and rotated about its vertical axis while supported by said bearing support, an arm extending from said center post, a basket carried by the outer end of said arm and movable into a position where it is in one of the jars or raised thereabove, means for raising and lowering said center post so that said basket when in lower-most position will be in correct operable position within each of said jars and when in upper-most position will be clear of each of said jars so that said basket may be moved laterally to the next adjacent jar, means for indexing said center post and basket from one jar to the next when said basket is in raised position, a cover overlying all of said jars to minimize escape of vapors therefrom, said cover plate having a single basket opening therethrough larger than and axially aligned with said basket and means connecting said center post with said cover plate so that when said basket is indexed said cover plate will be correspondingly indexed.

6. A washing machine comprising a plurality of jars arranged in circular position on a supporting plate, a center post, a bearing support for said post mounted in fixed relation to said plate whereby said post may be moved vertically and rotated about its vertical axis while supported by said bearing support, an arm extending from said center post, a basket carried by the outer end of said arm and movable into a position where it is in one of the jars or raised thereabove, means for raising and lowering said center post so that said basket when in lower-most position will be in correct operable posiiton within each of said jars and when in upper-most position will be clear of each of said jars so that said basket may be moved laterally to the next adjacent jar, non-positive means for urging rotation of said basket when in correct operable position, means for indexing said center post and basket from one jar to the next when said basket is in raised position, a cover plate overlying all of said jars to minimize escape of vapors therefrom, said cover plate having a single basket opening therethrough larger than and axially aligned with said basket, means connecting said center post with said cover plate so that when said basket is indexed said cover plate will be correspondingly indexed, and means for preventing rotation of said basket when positioned in operable position in certain of said jars.

7. A washing machine comprising a plurality of jars arranged in circular position on a supporting plate, a center post, a bearing support for said post mounted in fixed relation to said plate whereby said post may be moved vertically and rotated about its vertical axis while supported by said bearing support, an arm extending from said center post, a basket carried by the outer end of said arm and movable into a position where it is in one of the jars or raised thereabove, means for raising and lowering said center post so that said basket when in lower-most position will be in correct operable position within each of said jars and when in upper-most position will be clear of each of said jars so that said basket may be moved laterally to the next adjacent jar, non-positive means for urging rotation of said basket when in correct operable position, means for indexing said center post and basket from one jar to the next when said basket is in raised position, a cover plate overlying all of said jars to minimize escape of vapors therefrom, said cover plate having a single basket opening therethrough larger than and axially aligned with said basket, means connecting said center post with said cover plate so that when said basket is indexed said cover plate will be correspondingly indexed, and means for preventing rotation of said basket when positioned in operable position in certain of said jars, said means comprising members attached to and extending from said basket and means associated with said certain jars and extending inwardly from the jar wall a distance sufficient to engage said members extending from said basket.

8. A machine for transferring a basket to a succession of containers, said machine comprising a plurality of containers circularly arranged, a source of rotary power, a first clutch member driven continuously thereby, a second clutch member movable into and out of engagement with said first clutch member, a first rotatable shaft driven by said second clutch member, a second rotatable shaft related to and driven by said first shaft, a basket operatively connected with said second shaft to be actuated thereby and movable into a position where it is in one of the containers or raised thereabove, means operated by said power source for raising and lowering said first shaft, second shaft and basket, indexing means actuated by said power source in timed relation to the said raising and lowering means to cause said basket to be moved from a position over one container to a position over the next adjacent container while said basket is in raised position above said containers, and means for starting and stopping said source of rotary power.

9. A washing machine having means for causing vertical oscillation of a basket in a container and for causing cessation of said oscillation as said basket is being raised to a position above said container, said machine comprising a source of rotary power, a clutch operatively connected with said source of rotary power, a vertically movable rotatable drive shaft driven by said clutch, said clutch being in engagement when said shaft is in its lowermost position, a second shaft spaced laterally from said drive shaft and movable vertically along with said drive shaft, means for causing rotation of said second shaft by said drive shaft, a basket supported in relation to said second shaft, cam means interposed between said second shaft and said basket for causing vertical oscillation of said basket when said second shaft is rotated upon said clutch being in engagement and said basket is restrained against rotation, a container in which said basket is positioned when said drive shaft is in its lowermost position and said clutch is in engagement, means fixed with respect to said container for preventing rotation of said basket while said clutch is in engagement and said second shaft is rotating whereby vertical oscillation of said basket will continue so long as said clutch remains in engagement, cam and lever mechanisms operatively connected with said source of rotary power for raising and lowering said drive shaft and second shaft after a determined period of operation, said lever mechanism arranged to raise said shafts and said basket carried by said second shaft far enough to bring said basket above said container.

10. A machine for transferring a basket to a succession of containers, said machine comprising a plurality of containers circularly arranged, a source of rotary power, a first clutch member driven continuously thereby, a second clutch member movable into and out of engagement with said first clutch member, a first rotatable shaft driven by said second clutch member, a second rotatable shaft related to and driven by said first shaft, a basket operatively connected with said second shaft to be actuated thereby and movable into a position where it is in one of the containers or raised thereabove, means operated by said power source for raising and lowering said first shaft, second shaft and basket, and indexing means actuated by said power source in timed relation to the said raising and lowering means to cause relative lateral motion of said basket and container, from which said basket has been raised, whereby said basket will be positioned over the next adjacent container.

HERBERT B. BINGHAM.

REFERENCES CITED

The following references are of record in the file of this patent:

UNITED STATES PATENTS

| Number | Name | Date |
|---|---|---|
| 1,733,192 | Haber | Oct. 29, 1929 |
| 1,795,167 | Gross | Mar. 3, 1931 |
| 2,195,123 | Pabst | Mar. 26, 1940 |
| 2,277,508 | Bingham | Mar. 24, 1942 |
| 2,341,198 | Weiskopf | Feb. 8, 1944 |